(12) United States Patent
Hong et al.

(10) Patent No.: US 9,580,561 B2
(45) Date of Patent: Feb. 28, 2017

(54) MANUFACTURING METHOD OF POLY LACTIC ACID STEREOCOMPLEX USING SOLVENT CASTING METHOD

(75) Inventors: Chae Hwan Hong, Gyeonggi-do (KR); Do Suck Han, Gyeonggi-do (KR); Byeong Uk Nam, Chungcheongnam-do (KR)

(73) Assignees: Hyundai Motor Company, Seoul (KR); KOREA UNIVERSITY OF TECHNOLOGY AND EDUCATION INDUSTRY-UNIVERSITY COOPERATION FOUNDATION, Cheonan, Chungcheongnam-Do (KR)

( * ) Notice: Subject to any disclaimer, the term of this patent is extended or adjusted under 35 U.S.C. 154(b) by 0 days.

(21) Appl. No.: 13/286,480

(22) Filed: Nov. 1, 2011

(65) Prior Publication Data

US 2013/0030129 A1    Jan. 31, 2013

(30) Foreign Application Priority Data

Jul. 29, 2011    (KR) ........................ 10-2011-0076017

(51) Int. Cl.
| | |
|---|---|
| *C08G 63/08* | (2006.01) |
| *C08J 3/00* | (2006.01) |
| *C08J 5/18* | (2006.01) |
| *C08L 67/04* | (2006.01) |

(52) U.S. Cl.
CPC ................ *C08J 3/005* (2013.01); *C08J 5/18* (2013.01); *C08L 67/04* (2013.01); *C08J 2367/04* (2013.01); *C08L 2205/02* (2013.01)

(58) Field of Classification Search
CPC .... C08L 67/04; C08L 2205/02; C08J 2367/04
See application file for complete search history.

(56) References Cited

U.S. PATENT DOCUMENTS

2008/0097074 A1* 4/2008 Ouchi et al. .................. 528/354
2008/0177009 A1* 7/2008 Sodergard et al. ........... 525/450

FOREIGN PATENT DOCUMENTS

| CA | 2575049 | * | 1/2006 |
|---|---|---|---|
| JP | 2002356543 | A | 12/2002 |
| JP | 2005290257 | A | 10/2005 |
| JP | 2005325285 | A | 11/2005 |
| JP | 2007119553 | A | 5/2007 |
| JP | 2007-191630 | A | 8/2007 |
| JP | 2009001614 | A | 1/2009 |
| JP | 2010059354 | A | 3/2010 |
| KR | 2007-0043796 | A | 4/2007 |
| KR | 10-2007-0105990 | | 10/2007 |
| KR | 10-2010-0057774 | | 6/2010 |
| WO | 2006077776 | A1 | 7/2006 |

* cited by examiner

*Primary Examiner* — Ana Woodward
(74) *Attorney, Agent, or Firm* — Mintz Levin Cohn Ferris Glovsky and Popeo, P.C.; Peter F. Corless

(57) ABSTRACT

Disclosed is a method for manufacturing a polylactic acid film. More specifically, the present invention relates to a method for stably and effectively obtaining optimized stereocomplex crystals through specified boiling point and evaporation time of a solvent allowing the content of stereocomplex crystals to be 100%.

4 Claims, 2 Drawing Sheets

MANUFACTURING METHOD OF POLY LACTIC ACID STEREOCOMPLEX USING SOLVENT CASTING METHOD

CROSS-REFERENCE TO RELATED APPLICATIONS

This application claims priority to Korean Patent Application No. 10-2011-0076017, filed on Jul. 29, 2011, under 35 U.S.C. §119. The content of the aforementioned application is incorporated herein by reference in its entirety.

BACKGROUND (a) Technical Field

The present invention relates to a method for manufacturing a polylactic acid stereocomplex film using a solvent casting method.

(b) Background Art

Petrochemical-based plastics have long been used in our daily lives due to their advantages of mass producibility, lightness and low cost. They are disadvantageous in that they are not easily degraded and accumulate in the soil, unlike wood or other naturally-occurring materials. Also, due to a large amount of carbon dioxide emissions during incineration, such plastics have been blamed as one of the major culprits for global warming. Oil prices are expected to remain relatively high due to the depletion of fossil fuels available, and the regulations on the petrochemical-based plastics are becoming more strict to prevent global warming.

In this respect, resins or biodegradable plastics that can be degraded by microorganisms (bacteria, fungi, etc.) have been actively studied as post-petroleum materials. Examples of biodegradable resins include polyhydroxycarboxylic acid having aliphatic carboxyl ester units such as polylactic acid, polycaprolactone, and polyhydroxybutyrate.

Among them, polylactic acid has excellent heat resistance as well as well-balanced color and mechanical strength. Poly-L-lactic acid (hereinafter, also referred to as PLLA) or poly-D-lactic acid (hereinafter, also referred to as PDLA) has a melting point around 170° C. Despite the relatively high melting point, they have poor heat resistance when compared with the existing petrochemical-based polyesters represented by polyethylene terephthalate or polybutylene terephthalate, and thus are not suited for various applications. For instance, when polylactic acid is used to manufacture a food container, hot food cannot be put in the container. Accordingly, better heat resistance is required.

To improve the heat resistance, methods such as cross-linking, complexation (nanocomposites or stereocomplexes), high crystallization, etc., are employed. One of them is a method of preparing stereocomplex crystals having a melting point about 50° C. higher than that of homo-polylactic acid (PLA) by mixing the optical isomers poly-L-lactic acid and poly-D-lactic acid.

However, with this method, homo-PLA crystals are formed in addition to the stereocomplex crystals, and it is difficult to obtain a stereocomplex consisting only of stereocomplex crystals by heating. The presence of homo-PLA interferes with full utilization of high-melting properties of the stereocomplex. Therefore, a technique for manufacturing a PLA stereocomplex without containing homo-PLA is strongly needed.

SUMMARY

The present invention provides a method for manufacturing a polylactic acid film including only stereocomplex crystals in the absence of homo-PLA.

The present invention also provides a method for stably and effectively obtaining optimized stereocomplex crystals of PLLA and PDLA through specified boiling point and evaporation time of a solvent allowing the content of stereocomplex crystals to be 100%.

Other features and aspects will be apparent from the following detailed description, the drawings, and the claims.

In one aspect, the present invention provides a method for manufacturing a polylactic acid stereocomplex film, comprising the steps of: (i) mixing poly-L-lactic acid and poly-D-lactic acid in a solvent; and (ii) evaporating the solvent to cast the resulting poly lactic acid mixture solution.

In another aspect, the present invention provides a method for manufacturing a polylactic acid stereocomplex film, comprising the steps of: (i) mixing poly-L-lactic acid and poly-D-lactic acid in a solvent; and (ii) evaporating the solvent to provide the polylactic acid stereocomplex film.

BRIEF DESCRIPTION OF THE DRAWINGS

The above and other objects, features and advantages of the present invention will now be described in detail with reference to certain exemplary embodiments thereof. The drawings are meant for illustration purposes only, and are not meant to limit the invention.

DETAILED DESCRIPTION

Figure 1:
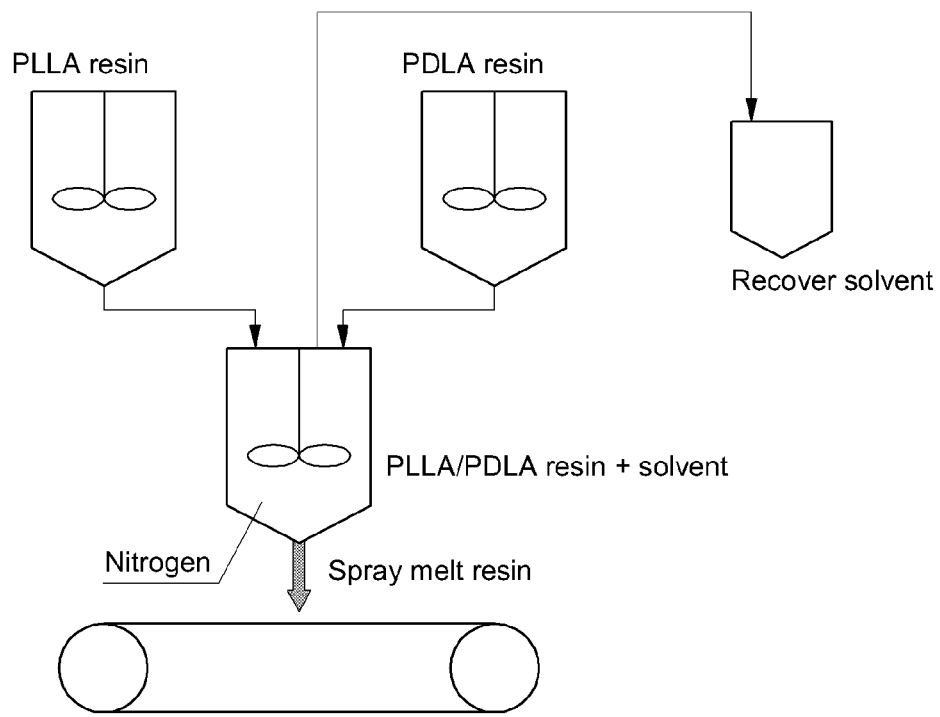
FIG. 1 schematically illustrates a method for preparing a film by the solvent casting method according to the present invention.

Hereinafter, reference will now be made in detail to various embodiments of the present invention, examples of which are illustrated in the accompanying drawings and described below. While the invention will be described in conjunction with exemplary embodiments, it will be understood that the present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

In one aspect, the present invention provides a method for manufacturing a polylactic acid stereocomplex film, comprising the steps of: (i) mixing poly-L-lactic acid and poly-D-lactic acid in a solvent; and (ii) evaporating the solvent to provide the polylactic acid stereocomplex film. In certain embodiments, a polylactic acid film is prepared by mixing the optical isomers poly-L-lactic acid and poly-D-lactic acid and thus forming stereocomplex crystals in order to improve heat resistance of polylactic acid.

In a specific embodiment of the present invention, the solvent is selected that satisfies Equation 1.

$$y = 0.0042x^2 - 0.2769x + 10 \pm 5 \qquad \text{Equation 1}$$

wherein x is the boiling point of the solvent, and y is the solvent evaporation time.

In accordance with the present invention, since the minimum time required to grow only the stereocomplex crystals depending on the solvent can be predicted theoretically, an optimized film consisting only of the stereocomplex crystals of PLLA and PDLA can be prepared stably. In particular, it enables one to predict the minimum time, and excessive fuel consumption for evaporation can be prevented.

In a specific embodiment of the present invention, 5-10 parts by weight of a mixture of the poly-L-lactic acid and the poly-D-lactic acid is added to 100 parts by weight of the solvent. The mixture of the poly-L-lactic acid and the poly-D-lactic acid is added in an amount of 5-10 parts by weight based on 100 parts by weight of the solvent. When the addition amount of the polylactic acid mixture is less than 5 parts by weight based on the solvent, it requires a relatively long time to form the stereocomplex crystals. Meanwhile, if the addition amount of the polylactic acid mixture is more than 10 parts by weight, the polylactic acid may not be sufficiently dissolved in the solvent, thus making it difficult to form the stereocomplex crystals. The mixing with the solvent may be achieved either by dissolving the poly-L-lactic acid and the poly-D-lactic acid in separate solvent and then mixing them or by dissolving the poly-L-lactic acid and the poly-D-lactic acid at once in the solvent.

In a specific embodiment of the present invention, the weight ratio of the poly-L-lactic acid to the poly-D-lactic acid ranges from about 1:0.2 to about 1:1.8. In a specific embodiment of the present invention, the weight ratio of the poly-L-lactic acid to the poly-D-lactic acid ranges from about 1:0.4 to about 1:1.6. In a specific embodiment of the present invention, the weight ratio of the poly-L-lactic acid to the poly-D-lactic acid ranges from about 1:0.5 to about 1:1.5. More specifically, the weight ratio of the poly-L-lactic acid to the poly-D-lactic acid may be 1:1. When the poly-L-lactic acid and the poly-D-lactic acid are used in similar amounts, it is easier to stably form the stereocomplex crystals.

In a specific embodiment of the present invention, the solvent is methylene chloride, dichloroethane, chloroform, dioxane, tetrachloroethane, pentane, petroleum ether, hexane, heptane, diethyl ether, triethylamine, t-butyl methyl ether, cyclohexane, acetone, methyl isobutyl ketone, methyl ethyl ketone, diethyl ketone, o-xylene, m-xylene, p-xylene, toluene, dimethoxyethane, benzene, 1-chlorobutane, THF, HMPA, 2-ethoxyethyl ether, N,N-dimethylacetamide, DMF, pyridine, benzonitrile, 1-methyl-2-pyrrolidinone, acetic anhydride, DMSO, chlorobenzene, carbon disulfide, 1,2-dichlorobenzene, nitromethane, 1,1,2-trichlorotrifluoroethane, carbon tetrachloride or a mixture thereof. More specifically, the solvent used in the present invention is methylene chloride, dichloroethane, chloroform, dioxane, tetrachloroethane or a mixture thereof, but any solvent capable of dissolving both the poly-L-lactic acid and the poly-D-lactic acid, while satisfying Equation 1, may be used without being limited to the above-described solvents.

In certain embodiments, the film comprises 0% of homo-PLA crystals. In other embodiments, the film comprises 0% to 1% of homo-PLA crystals.

In a specific embodiment of the present invention, the film may comprise 99% or more of stereocomplex crystals of PLLA and PDLA in the film.

In a specific embodiment of the present invention, the poly-L-lactic acid and the poly-D-lactic acid are mixed in the solvent at 0-100° C. In a specific embodiment of the present invention, the poly-L-lactic acid and the poly-D-lactic acid are mixed in the solvent at 10-50° C. In a specific embodiment of the present invention, the poly-L-lactic acid and the poly-D-lactic acid are mixed in the solvent at 15-40° C.

In a specific embodiment of the present invention, the poly-L-lactic acid and the poly-D-lactic acid are mixed in the solvent for 0.25-24 hours. In a specific embodiment of the present invention, the poly-L-lactic acid and the poly-D-lactic acid are mixed in the solvent for 0.5-12 hours. In a specific embodiment of the present invention, the poly-L-lactic acid and the poly-D-lactic acid are mixed in the solvent for 1-10 hours. In a specific embodiment of the present invention, the poly-L-lactic acid and the poly-D-lactic acid are mixed in the solvent for 1-3 hours.

In a specific embodiment of the present invention, the poly-L-lactic acid and the poly-D-lactic acid are mixed in the solvent at 15-40° C. for 1-3 hours. Under this condition, a more uniform solution is formed and the stereocomplex crystals are formed more easily.

In a specific embodiment of the present invention, the evaporation is performed at 15-100° C. In a specific embodiment of the present invention, the evaporation is performed at 15-75° C. In a specific embodiment of the present invention, the evaporation is performed at 15-50° C. In a specific embodiment of the present invention, the evaporation is performed at 15-40° C.

In a specific embodiment of the present invention, the evaporation is performed for 0.5-72 hours. In a specific embodiment of the present invention, the evaporation is performed for 1-48 hours. In a specific embodiment of the present invention, the evaporation is performed for 2-24 hours. In a specific embodiment of the present invention, the evaporation is performed for 6-24 hours. In a specific embodiment of the present invention, the evaporation is performed for 12-24 hours.

In a specific embodiment of the present invention, the evaporation is performed at 15-40° C. for 12-24 hours. Since the solvent evaporation time affects the formation of the stereocomplex crystals, the time is controlled depending on the solvent. In order to cast the polymer mixture solution, the solvent is evaporated at 15-40° C., more specifically at room temperature, i.e., 20-30° C., for 3-48 hours, more specifically for 12-24 hours.

In another aspect, the present invention provides a polylactic acid film prepared by the method described above. The polylactic acid film according to the present invention is environment-friendly since it is biodegradable and can be utilized in various applications because of high heat resistance. The film may be vacuum-dried and used to manufacture various products.

In a specific embodiment of the present invention, the polylactic acid film comprises 99% or more of stereocomplex crystals in the film (PLLA and PDLA). More specifically, it comprises 100% of stereocomplex crystals in the polylactic acid film. In certain embodiments, the film comprises 0% to 1% homo-PLA crystals. In certain embodiments, the film comprises 0% homo-PLA crystals.

EXAMPLES

The examples and experiments will now be described. The following examples and experiments are for illustrative purposes only and not intended to limit the scope of this invention.

Example 1

Poly-L-lactic acid and poly-D-lactic acid were dried at 60° C. for 24 hours, mixed at a weight ratio of 1:1, dissolved in an amount of 5-10 parts by weight in methylene chloride based on 100 parts by weight of the solvent, and stirred at room temperature for 1-3 hours to prepare a mixture solution.

The solvent was removed from the resulting polymer solution through spontaneous evaporation at room temperature for 12 hours according to the solvent casting method to obtain a polylactic acid film.

Example 2

A polylactic acid film was prepared in the same manner as in Example 1, except for using dichloroethane as the solvent.

Example 3

A polylactic acid film was prepared in the same manner as in Example 1, except for using chloroform as the solvent.

Example 4

A polylactic acid film was prepared in the same manner as in Example 1, except for using dioxane as the solvent.

Example 5

A polylactic acid film was prepared in the same manner as in Example 1, except for using tetrachloroethane as the solvent.

Comparative Example 1

A polylactic acid film was prepared in the same manner as in Example 1, except for extending the solvent evaporation time to 24 hours.

Comparative Example 2

A polylactic acid film was prepared in the same manner as in Example 1, except for extending the solvent evaporation time to 48 hours.

The structural formulas and boiling points of the solvents used in Examples 1-5 and Comparative Examples 1-2 are summarized in Table 1.

TABLE 1

| Solvent | Structural formula | Boiling point (° C.) |
|---|---|---|
| Methylene chloride | 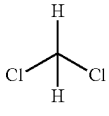 | 39.6 |
| 1,1-Dichloroethane | 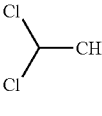 | 57.2 |
| Chloroform | 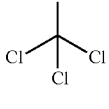 | 61.1 |
| Dioxane | 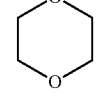 | 101.1 |

TABLE 1-continued

| Solvent | Structural formula | Boiling point (° C.) |
|---|---|---|
| 1,1,1,2-Tetrachloroethane | 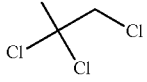 | 130.5 |

Test Example 1

Weight-average Molecular Weight ($M_w$)

Figure 2:
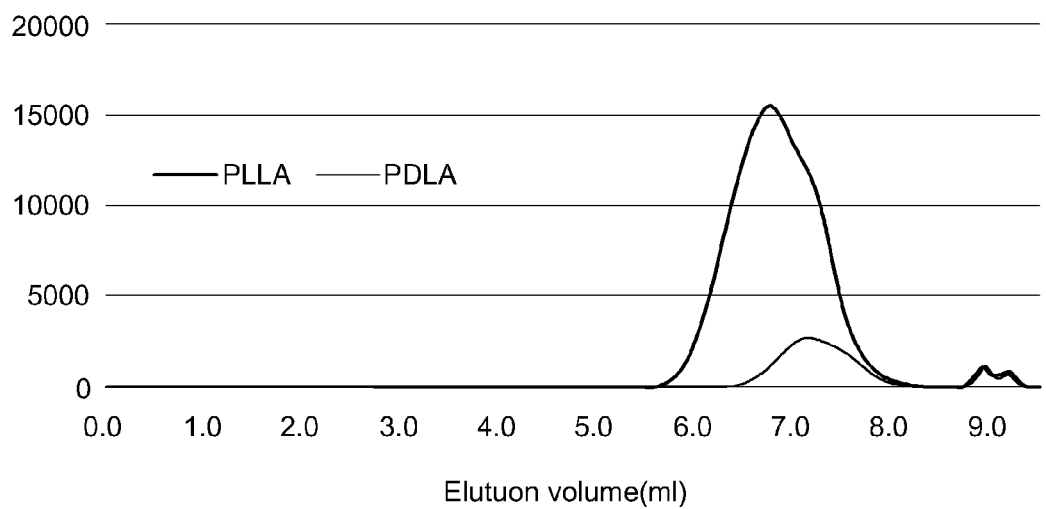
FIG. 2 shows a result of measuring weight-average molecular weight of poly-L-lactic acid and poly-D-lactic acid by GPC.
Figure 3:
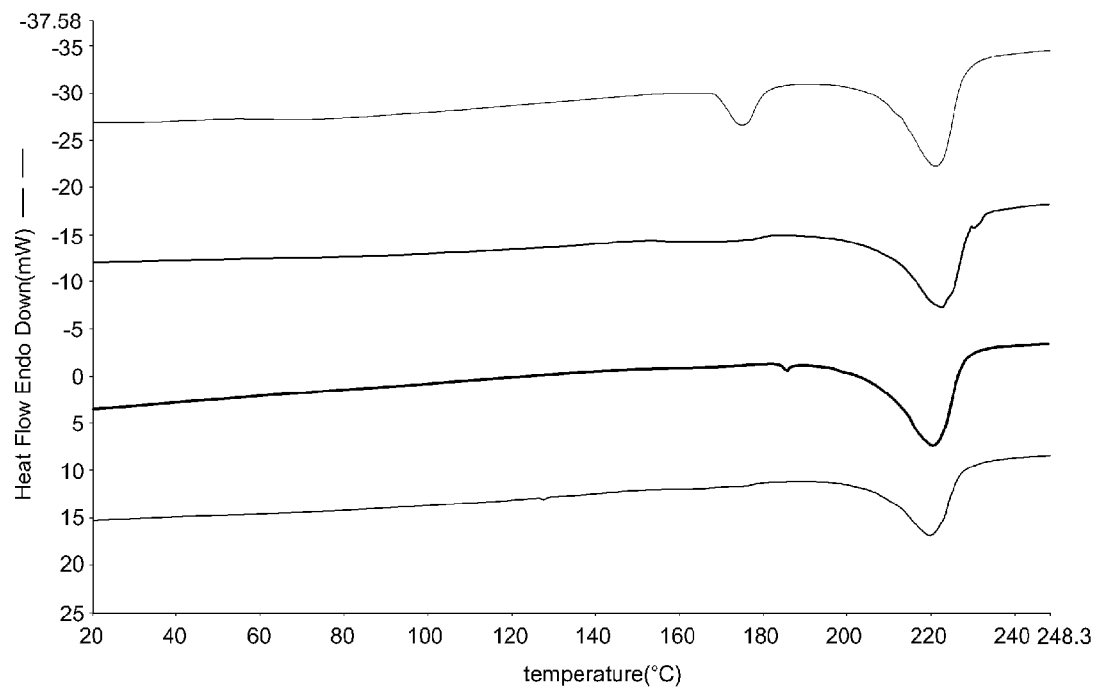
FIG. 3 shows a DSC analysis result for Example 1 and Comparative Examples.
Figure 4:
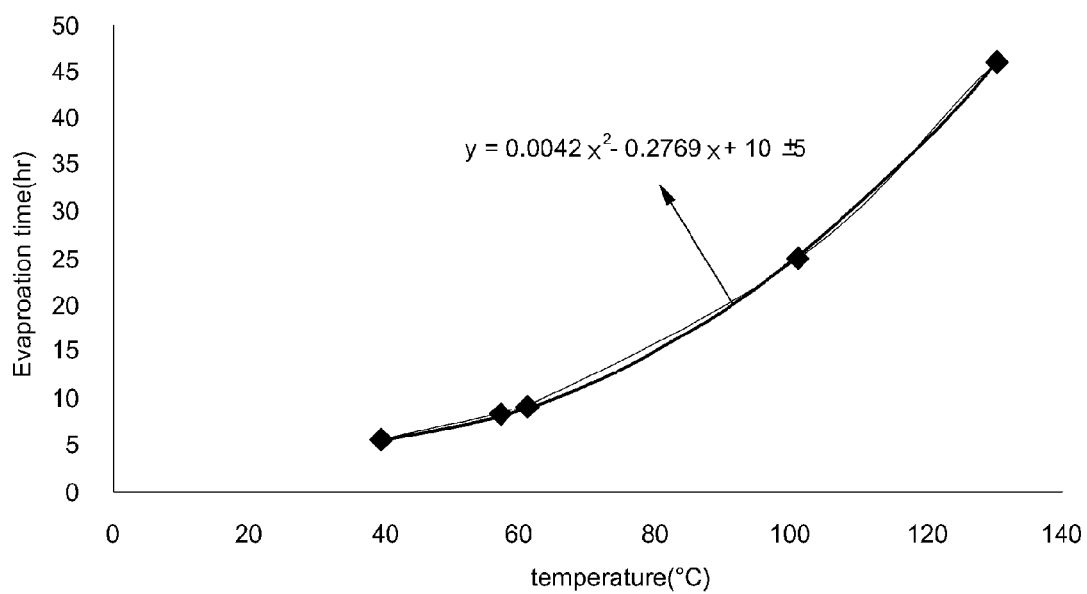
FIG. 4 shows a relationship between the boiling point and evaporation time of a solvent allowing the content of stereocomplex crystals to be 100%.

The weight-average molecular weight of the poly-L-lactic acid and the poly-D-lactic acid used in the examples was measured. The result is shown in FIG. 2.

Polystyrene-equivalent molecular weight was measured by gel permeation chromatography (GPC). The instruments used for the measurement are summarized in Table 2.

TABLE 2

| Detector | RI-G1362A, Agilent Technologies |
|---|---|
| Pump | G1310A, Agilent Technologies |
| Oven | G1316A, Agilent Technologies |
| GPC analysis | G2170AA, Agilent Technologies |
| Column | 79911GF-MXA (8 mm, 7.5 × 300 mm), Agilent Technologies |

Measurement method: The molecular weight measurement was made at 25° C., for 20 μL of a 1 wt % sample with an eluent flow rate of 1.0 mL/min.

The result is shown in FIG. 2.

Test Example 2

Measurement of Thermal Properties and Stereocomplex Crystal Content (1) Thermal Properties The films prepared in Examples 1-5 and Comparative Examples 1-2 were tested after drying in vacuum at 140° C. A differential scanning calorimeter (Pyris Diamond DSC, Perkin Elmer) was used for the measurement. A sample weighing 5-10 mg was heated in an aluminum pan from 20° C. to 250° C. at a heating rate of 20° C./min, while measuring the heat of fusion ($\Delta H_m$) and the melting point ($T_m$) under nitrogen atmosphere. The enthalpy of fusion of each crystal was calculated from the area under the crystal melting peak in the DSC curve. The result is shown in Table 3.

TABLE 3

| Evaporation time | $T_g$ (° C.) | $T_m$ (° C.) | $\Delta H_m$, H (J/g) | $\Delta H_m$, SC (J/g) | $\Delta H_m$, SC/$\Delta H_m$, Total (%) |
|---|---|---|---|---|---|
| 3 hrs | | 175.4/221.3 | 7.8 | 45.3 | 85 |
| 12 hrs | | 222.4 | 0 | 63 | 100 |
| 1 day | | 220.5 | 0 | 66.6 | 100 |
| 2 days | | 219.8 | 0 | 64.1 | 100 |

(2) Stereocomplex Crystal Content

The stereocomplex crystal content was calculated according to Equation 2 from the heat of fusion for homocrystals ($\Delta H_m$,H) occurring at 150-190° C. and the heat of fusion for stereocomplex crystals ($\Delta H_m$,S) occurring at 200-230° C. in the DSC analysis. The stereocomplex crystal content for each solvent depending on the evaporation time is shown in Table 4.

$$\text{Stereocomplex crystal content (\%)} = \frac{\Delta H_m, S}{\Delta H_m, H + \Delta H_m, S} \times 100 \qquad \text{Equation 2}$$

TABLE 4

| | Solvent evaporation time (hr) | | | | | | |
|---|---|---|---|---|---|---|---|
| | 4 | 8 | 12 | 16 | 20 | 24 | 48 |
| Methylene chloride (%) | 85 | 100 | 100 | 100 | 100 | 100 | 100 |
| Dichloroethane (%) | 66 | 90 | 100 | 100 | 100 | 100 | 100 |
| Chloroform (%) | 60 | 81 | 92 | 100 | 100 | 100 | 100 |
| Dioxane (%) | 51 | 69 | 82 | 90 | 96.5 | 100 | 100 |
| Tetrachloroethane (%) | 42 | 57 | 67 | 74 | 79 | 84 | 100 |

As apparent from Table 4, it has been demonstrated that a sufficient solvent evaporation time leads to effective stereocomplex formation because of increased mobility of polymer chains in the solution. Also, it can be seen that the evaporation time required to form only the stereocomplex crystals is different depending on the solvent.

Therefore, it can be seen that, since the solvent evaporation time to achieve a stereocomplex crystal of 100% can be expected when the solvent for casting is selected, a polylactic acid film consisting only of the stereocomplex crystals can be prepared stably and effectively.

The features and advantages of the present invention can be summarized as follows.

(i) The method for manufacturing a polylactic acid film according to the present invention allows the preparation of a film consisting only of stereocomplex crystals without homo-PLA.

(ii) More specifically, optimized stereocomplex crystals can be formed stably and effectively by specifying the boiling point and evaporation time of a solvent allowing the content of stereocomplex crystals to be 100%.

The present invention has been described in detail with reference to specific embodiments thereof. However, it will be appreciated by those skilled in the art that various changes and modifications may be made in these embodiments without departing from the principles and spirit of the invention, the scope of which is defined in the appended claims and their equivalents.

INCORPORATION BY REFERENCE

The contents of all references (including literature references, issued patents, published patent applications, and co-pending patent applications) cited throughout this application are hereby expressly incorporated herein in their entireties by reference.

EQUIVALENTS

Those skilled in the art will recognize, or be able to ascertain using no more than routine experimentation, many equivalents of the specific embodiments of the invention described herein. Such equivalents are intended with be encompassed by the following claims.

What is claimed is:

1. A method for manufacturing a polylactic acid stereocomplex film, comprising the steps of:
   (1) selecting a solvent whose boiling point ranges from 39.6° C. to 130.5° C.;
   (2) calculating minimum evaporation time required to achieve 100% of stereocomplex crystals by evaporating the selected solvent using Equation 1

$$y = 0.0042x^2 - 0.2769x + 10 \pm 5 \qquad \text{Equation 1}$$

wherein x is the boiling point of the selected solvent, and y is the minimum evaporation time required to achieve 100% of stereocomplex crystals by evaporating the selected solvent in hours;
   (3) mixing only poly-L-lactic acid and poly-D-lactic acid in a solvent; and
   (4) evaporating the selected solvent for the minimum evaporation time calculated in step (2) at 20~30° C.,
   wherein the polylactic acid stereocomplex film consists of 100% of stereocomplex crystals of the poly-L-lactic acid and the poly-D-lactic acid, and
   the minimum evaporation time calculated in step (2) ranges from 0.6 hour to 50.4 hours.

2. The method according to claim 1, wherein 5-10 parts by weight of a mixture of the poly-L-lactic acid and the poly-D-lactic acid is added to 100 parts by weight of the solvent.

3. The method according to claim 2, wherein the weight ratio of the poly-L-lactic acid to the poly-D-lactic acid ranges from about 1:0.5 to about 1:1.5.

4. The method according to claim 1, wherein the solvent is methylene chloride, chloroform, dioxane, tetrachloroethane, petroleum ether, hexane, heptane, triethylamine, t-butyl methyl ether, cyclohexane, acetone, methyl isobutyl ketone, methyl ethyl ketone, diethyl ketone, toluene, dimethoxyethane, benzene, 1-chlorobutane, THF (tetrahydrofuran), pyridine, carbon disulfide, nitromethane, 1,1,2-trichlorotrifluoroethane, carbon tetrachloride or a mixture thereof.

\* \* \* \* \*